United States Patent [19]

Schaeffler et al.

[11] Patent Number: 4,600,202
[45] Date of Patent: Jul. 15, 1986

[54] FLEXIBLE BRUSH-TYPE SEAL WITH LAYERED MOVING SEALING SURFACE

[75] Inventors: Arthur Schaeffler, Vierkirchen; Klemens Werner, Munich, both of Fed. Rep. of Germany

[73] Assignee: MTU Motoren - und Turbinen-Union Muenchen GmbH, Fed. Rep. of Germany

[21] Appl. No.: 763,656

[22] Filed: Aug. 8, 1985

[30] Foreign Application Priority Data

Aug. 11, 1984 [DE] Fed. Rep. of Germany ....... 3429708

[51] Int. Cl.⁴ ...................... F16J 15/12; F16J 15/447
[52] U.S. Cl. ..................................... 277/53; 277/901
[58] Field of Search .................. 277/53, 1, 901, 54–57

[56] References Cited

U.S. PATENT DOCUMENTS

| Re. 30,206 | 2/1980 | Ferguson et al. | 277/53 X |
|---|---|---|---|
| 2,878,048 | 3/1959 | Peterson | 277/53 X |
| 4,192,516 | 3/1980 | McCort | 277/53 X |
| 4,358,120 | 11/1982 | Moore | 277/53 X |

FOREIGN PATENT DOCUMENTS

| 2344666 | 3/1974 | Fed. Rep. of Germany | 277/53 |
|---|---|---|---|
| 439367 | 12/1935 | United Kingdom | 277/53 |
| 1586362 | 3/1978 | United Kingdom | 277/53 |
| 2021210 | 11/1979 | United Kingdom | 277/53 |
| 2022197 | 12/1979 | United Kingdom | 277/53 |

OTHER PUBLICATIONS

IBM Technical Disclosure Bulletin, vol. 22, No. 8A, Jan. 1980, Evans et al., 2 pages.

*Primary Examiner*—Robert S. Ward
*Attorney, Agent, or Firm*—Craig & Burns

[57] ABSTRACT

A brush-type seal between machine components in relative motion one with respect to the other, of which at least one member rotates, in which the strands or bristles consist of composite fibers designed for good thermal conductivity in at least portions of their surface and at least the core has flexible, elastic properties. The plurality of bristles are made of combinations of glass and metal or ceramic or plastic materials and various manufacturing processes and arrangements may be used. The fibers are densely combined, massed, bundled or associated otherwise, preferably radially retained or arranged to advantage in annular brushes. The brush seals such as fluid seals are arranged in a particular application on the stator or rotor of a machine, preferably a turbomachine. This brush-type seal is applicable to seal two chambers under different pressure.

20 Claims, 14 Drawing Figures

FLEXIBLE BRUSH-TYPE SEAL WITH LAYERED MOVING SEALING SURFACE

The present invention relates to a brush-type seal arranged between machine components which permit of relative motion between them and of which at least one is rotatable. With seals between machine components in relative motion one with respect to the other, the danger exists that the machine components approach one another to a point where severe friction between the contacting members may cause excessive heating and perhaps even destruction of the seal. This at least is the case with packing-type seals, labyrinth seals, etc. Even in the case of metal brush seals designed to reduce friction, the frictional effect is still considerable. Brush seals provide an advantage, however, in that they are better suited to adapt to variations in radial clearance between parts, especially rotating parts, in relative motion one with the other.

It is the principal object of the present invention to provide a brush seal which retains the advantage to resiliently overcome changes in radial clearances, such as are caused, by friction.

The underlying problems are solved according to the present invention in that the bristles of the brush-type seal include a non-conductive or semiconductive core and at least partly a conductive sheet or cover and/or coating and in that at least the core has flexible, elastic properties.

The inventive concept also embraces all combinations and subcombinations of the features as described, illustrated and claimed herein taken alone or with each other and also with features of the prior art.

The most substantial benefits provided by the present invention are: the bristles used in the brush seal of the present invention include a plurality of flexible but high-strength fibers permitting the contact pressure necessary for sealing, while reducing the attendant friction considerably.

Compared to metal wires which cannot be manufactured with such extreme thinness, the further advantage exists with the seals of the present invention that they will not cause sparking, or even unwanted abrasion particles.

The fibers can be mounted or packed to suit the specific application. This also applies to the geometric arrangement of the fibers relative to or association with the machine components.

As disclosed herein, the composition of the components of the fiber materials, their size, the fiber mounting and the arrangement of the fibers can all be selected to considerably improve the flexibility or resilience of the seal. Wear, abrasion and comparable effects can be very much alleviated and, in part, be eliminated altogether. The sliding properties and the notch strength are greatly improved. The dissipation of heat can also be enhanced by the special construction of the composite bristles, at least in those portions contacting a machine component. Thin or thick film techniques applied, allow fine adjustment of composite layers and their properties.

These and other objects, features and advantages of the present invention will become more apparent from the following description of several embodiments of the present invention, when taken in conjunction with the accompanying drawing, which shows, for purposes of illustration only, several embodiments of the invention, and wherein.

Figure 1:
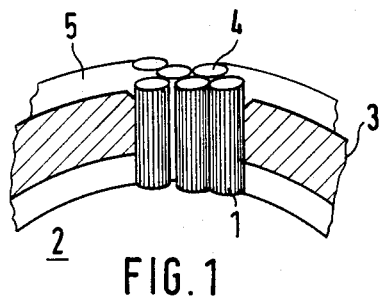
FIG. 1 illustrates a brush seal with a radial bristle arrangement according to this invention.
Figure 2A:
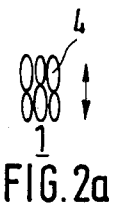
FIGS. 2a to 2d illustrate various fiber packing arrangements according to this invention.
Figure 2B:
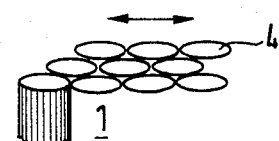
Figure 2C:
Figure 2D:
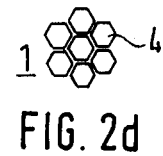

Referring now to the drawing wherein like reference numerals are used to designate like parts in the various views thereof, and more particularly to FIG. 1, this figure illustrates the overall arrangement of a brush seal 1 between two relatively movable machine components 2 and 3. The member 2 may be the rotating component and the member 3 the stationary component, for example, a housing or casing. In this arrangement, the bristles made of fibers 4 which can be made from various metals, plastics and glass, or various types of glass, glass-metals, glass-ceramics, or a combination thereof, can be seen in their radial orientation. The fibers 4 are thereby clustered individually or are preferably bunched together and kept together, preferably in individual groups of bristles (cf. FIG. 2), by processes such as vitrifying or soldering, or are sintered or pressed in place using cermets or ceramic materials, or are potted using plastics, or are cemented in place, or are sprayed or treated comparably all around, and are thereby mounted in the process. The carrier member used for mounting, or the retaining element or the enveloping or packing compound 5 may likewise contain or consist of a metal, a ceramic, plastic or glass material or combinations thereof. This equally applies to the rotor 2. As a rule, the materials mated are similar. In some cases, however, it may be desirable to make the one mate (machine component) harder than the other.

With reference now to FIG. 2, for optimum brush coverage, the individual fibers are preferably packed or bundled together in groups and as densely as possible. Jointed together in FIGS. 2a and 2b are fibers that take the form of flat shapes in at least one end area, using a brick-type masonry pattern, where FIG. 2a shows a structure in chiefly the vertical direction and FIG. 2b one in chiefly the horizontal direction. Each small flat plate may take a different form, as perhaps essentially oval in FIGS. 2a and 2b. FIG. 2c illustrates a triangular structture of fibers, composed especially of isosceles triangles in their end area, while FIG. 2d shows a honeycomb-type structure, where the individual fiber takes a hexagonal form in at least its end area or is reinforced in this hexagonal shape at its end.

Figure 3:
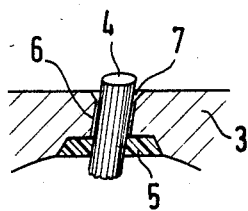
FIG. 3 is a partial cross-sectional detail view of a fiber mounting according to this invention.

FIG. 3 illustrates an embodiment in which the brush seal is arranged, for example, in a ring 3, in such a manner that the bristles are oriented radially inwardly or at an angle therewith by inserting clustered groups 1 of fibers in chamfered or spot-faced holes 6 and once seated, potting them with a conventional plastic compound to join them together and to the ring 3. They can also be cemented into place, using a plastic adhesive. The same process can also be used on the top side of the ring 3 in FIG. 3. They can also be seated advantageously by vitrifying, using a glass compound 5 and an external source of energy, such as laser beams. For the compound 5, use can be made also of a metallic or ceramic powder to be sintered in place on the machine component. Depending on the material selected for the machine component, a similar or comparable sintering powder can be used, together with a binding agent if necessary. The sintering process can be replaced or assisted by a pressing process. Metallic brazing alloys can be fused into place and to the component using conventional external sources of heat. Use can also be made of such methods as pouring into place or spray coating all over with metallic or ceramic materials, including cermets and glass ceramic materials, especially powders.

While FIG. 4 illustrates an arrangement similar to that of FIG. 1, in which, however, the fiber structure is arranged in a machine component, not radially as shown in FIG. 1, but at an angle thereto or counter the direction of rotation. FIG. 4a shows the arrangement and attachment of the fiber structure in the stationary member; FIG. 4b shows it in the rotating member. The brush seal of the present invention is naturally suitable for use also on one or both of two counter-rotating members, also e.g. in an axial direction of one or several shafts in a row, especially where these are arranged coaxially.

Figure 4A:
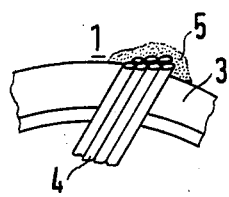
FIGS. 4a through 4d illustrate a brush seal using inclined bristles.
Figure 4B:
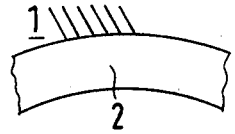
Figure 4C:
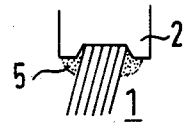

Illustrated in FIG. 4c is a fiber structure 1 on a rotor disk 2 at an axial angle to a stationary member 3 for relative and also translatory movement.

Figure 4D:
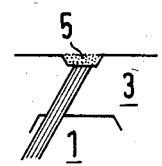

As shown in FIG. 4d, a fiber structure 1 is arranged in a ring axially inclined, i.e., at an angle relative to the center line of the rotating member 2.

As will become apparent from FIGS. 5a through 5d, the inventive concept embraces various combinations of individual fibers which, in at least partial surface areas, are all constructed for good thermal conductivity and of which at least the core exhibits resilient properties.

Figure 5A:
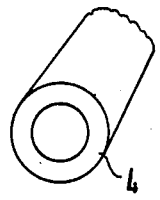
FIGS. 5a to 5d illustrate single fibers coated at least partially in various manners according to this invention.

FIG. 5a thus illustrates a core/sheath configuration, where the sheath can also be formed by an external coating layer which completely surrounds the core.

Figure 5B:

FIG. 5b illustrates a composite fiber having a coating on only a portion of its surface, which in this embodiment is its upper half. In the same manner, both mutually contacting parts can be coated in a mated or matched manner.

Figure 5C:
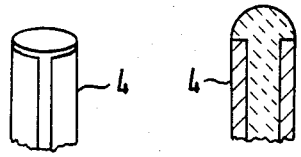

FIG. 5c illustrates a core having an end surface region intended only for contact with the other machine component, such as a coating (e.g. at the tip of the bristle).

Figure 5D:
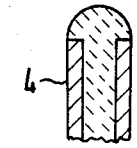

FIG. 5d illustrates a tubular (hollow) fiber having a filler element projecting from it. Combinations between these embodiments are naturally possible, where the core or the envelope is made of a thermally conductive or insulating material and the (relatively good) thermally conductive material or the insulating material extends to cover more or less large surface areas of the respective other fiber component. The conductive material, however, should be arranged at least at the tip of the bristle and provide a heat-dissipating bridge to the retaining elements and/or machine components for purposes of heat dissipation which depends on the thermal conductivity of the material and on the available thermally conductive area (cross-sectional area) if heat dissipation is required or desirable by the concept involved).

The accompanying table, although not intending to limit the invention in any manner, lists core/sheath materials for the composite structure. Reference is made especially to the claims, which also indicate the processes used to manufacture the sheath or coating. Use can be made also of conventional glass fiber manufacturing techniques, including those for optical fibers, as also of manufacturing processes for composite fiber materials, in which, for example, glass fibers, boron fibers, carbon fibers, silicon or silicon-containing fibers are impregnated with or joined to vitreous, ceramic, metallic material or (high-polymer) plastics. Suitable constituents of the composite fiber would also be metal whiskers or monocrystals.

The combination of materials for the respective composite fiber varies with the intended application and the properties needed in it, such as strength, resilience, conductivity or insulation properties (magnetic, electric, thermal), flexibility, elasticity and resistance to temperature and chemical attack (corrosion). In the selection, another consideration is naturally also that the combination of the materials used for a fiber, or the fibers proper, can be easily manufactured and/or coated and produce the required quality and life. A good union to be achieved between the core and the sheath is another consideration. Good results have been achieved by physical or chemical vapor deposition of coatings on a substrate such as the core, but spraying and dipping processes also show good results. The core can be manufactured by melt-spinning, melt-spraying, extruding or atomizing to take the endless or sectioned shape of fibers, filaments, or threads in wire or hose-like form. If necessary, the sheath can be joined to the core at the junction by alloying or some other comparable process. Optionally, the junction can be produced by a method commonly used with optical fibers, i.e. by internally coating a tubular fiber, where, upon collapse of the tubular fiber, the layer itself forms a core. The core or coating/sheath can be made also from amorphous metals (also termed glass metals). Use can be made also of rare earth metals and noble metals as alloying additions. Suitable also are composite aluminum-glass materials, glass solder compounds with metals, ceramic materials and different types of glass. For use as solders and solder glass, use can be made especially of borate glass containing lead and zinc.

Suitable especially for the thin-film coating of glass surfaces is the sol/gel process. The sheathing layer should normally be a few $\mu$m thick. This holds true also for the core, which should be preferably as thin as possible, approximately 5 $\mu$m, but should not exceed 50 $\mu$m in a diameter. The same holds true especially for boron and carbon glass fibers, but also for plastics.

The inventive concept is not limited to a core/sheath structure, nor to a two-layer composite material; rather, several layers of various materials can naturally be combined one on the other, depending on the application and on the economy of the manufacturing method (without a quality penalty). For instance, a glass fiber core, a glass fiber envelope and a coating may be joined together into a composite fiber. (In the process, glass types of various different moduli of elasticity are combined to advantage). This coating can be achieved also by suitably doping the envelope. Ideally, the composite fiber should be manufactured in preferably a single operation, as can be done with melt-spinning or- atomizing with the aid of core/sheath nozzles. Good use can be made also of a continuous fiber-drawing process with a simultaneous sheath or coating formation (for example, at the exit end of the drawing tool) by electrolytic process or some other dipping, pressing or spraying process, including electrostatic coating. In the selection of materials to enter in the composite fiber, their suitability for joining together in groups to form a mounting or a mounting retaining-element should be considered. Such retaining elements (brush bodies or bristle carriers) again should readily join with the machine component on which they are intended to go. The mounting or retaining elements can also be manufactured separately. If good sliding or even lubricating properties are intended, graphite, $MoS_2$ or a suitable plastic material can be used in the hollow core of a fibre or on at least portions of their surface. Certain plastic fibers, which lend themselves readily to metallic coating (e.g. after doping), are likewise suitable for the fibers. For example, the addition of iodine will make a polymer plastic of an organic Si compound electrically conductive.

Ni Fe alloys can be deposited in a thin film, for example, on top of a Ti/Au layer on a glass or plastic core to make the fiber externally magnetic or magnetizable.

| | materials of the composite in |
|---|---|
| Fibers | Monocrystals (e.g. Si), metal whiskers |
| | metallic: Au, Ag, Al, Cu, Ni, Co, Cr, Ti, Mo, Si |
| | and alloys thereof. |
| | metal oxide containing: (PbO, ZnO, $In_2O_3$) |
| Filament | Ceramic: $Al_2O_3$, $TiO_2$, $ZrO_2$, $B_4C$, SiC |
| (core) | vitreous: $SiO_2$, B, C: |
| (tube) | (metallized) FEP plastics (Kevlar) |
| | (sintered) |
| Filler optional | C, graphite, $MoS_2$, Pb, Zn, ceramics |
| (intermediate) Layer | Ti, Ni, Cr, Co, Au, Ag, Al, Si, Cu and alloys thereof, poly—Si, polyimide |
| Envelope optional | $MgF_2$, Zn S, $In_2O_3$, $SnO_2$ |
| (external) Coating (sheath) | Au, Ag, Al, Si, Cu, Pb, Zn, In, Ni, Co, Cr, Mo and alloys or compounds thereof, carbon black |
| layer | SiC, TiC, $TiSi_2$, Ti $B_2$, Mo $Si_2$, TiN, BN, $TiO_2$, indium oxide |

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A brush-type seal for at least two machine components relatively movable to each other and at least one of which is rotatable, the brush-type seal comprising a plurality of bristles in an envelope, wherein a bristle includes a core portion attached to one of the components and having elastic properties and a layer portion providing a continuously moving sealing surface to another of said components and made from a material different from that of the core portion.

2. A seal according to claim 1, wherein at least one bristle core and its envelope is made of a composite material with one material selected from the group of materials consisting of glass, metal, plastic, and ceramic.

3. A seal according to claim 1, wherein said layer portion is made of a material selected from the group consisting of gold, silver, aluminum, copper, silicon, lead, zinc, indium, nickel, cobalt, chrome, molybdenum, metal oxides, nitrides, sulfides, fluorides, carbides, borides, silicides, glass metal, glass ceramics, carbon, and plastics.

4. A seal according to claim 3, wherein the bristle portion has a thickness of about 1 to about 100 microns and the bristle layer portion of about 0.2 to about 1 $\mu$m.

5. A seal according to claim 4, wherein the bristle core portion has a thickness of about 5 $\mu$m to about 50 $\mu$m.

6. A seal according to claim 4, wherein the bristle core portion is fibrous and made by one of a process consisting of melt-spraying, melt-spinning and atomizing.

7. A seal according to claim 6, wherein the bristle layer portion is deposited on the core by one of the processes consisting of physical vapor deposition, sputtering, electroplating, electrolysis, chemical vapor deposition, spraying, dipping, and electrostatic coating.

8. A seal according to claim 7, wherein the bristle layer portion and the bristle core portion are joined one to the other by one of the processes consisting of diffusion and alloying.

9. A seal according to claim 8, wherein the bristle layer portion is attached to the bristle core portion by one of the processes consisting of alloying, vitrifying, laser fusion process and radiation fusion.

10. A seal according to claim 9, wherein the bristles are attached to a retaining element made of a material selected from the group consisting of glass, metal, ceramic and plastics by one of the processes consisting of packing singly, packing in bundles, pressing, sintering, fusing, soldering and cementing, spraying, and melting.

11. A seal according to claim 1, wherein the bristle core portion has a thickness of about 1 to about 100 microns and the bristle layer portion of about 0.2 to about 1 $\mu$m.

12. A seal according to claim 1, wherein the bristle core portion has a thickness of about 5 $\mu$m to about 50 $\mu$m.

13. A seal according to claim 1, wherein the bristle core portion is fibrous and made by one of a process consisting of melt-spraying, melt-spinning and atomizing.

14. A seal according to claim 13, wherein the bristle layer portion is deposited on the core by one of the processes consisting of physical vapor deposition, sputtering, electroplating, electrolysis, chemical vapor desposition, spraying, dipping, and electrostatic coating.

15. A seal according to claim 14, wherein the bristle layer portion and the bristle core portion are joined one to the other by one of the processes consisting of diffusion and alloying.

16. A seal according to claim 14, wherein the bristle layer portion is attached to the bristle core portion by one of the processes consisting of alloying, vitrifying, laser fusion process and radiation fusion.

17. A seal according to claim 1, wherein the bristles are attached to a retaining element made of a material selected from the group consisting of glass, metal, ceramic and plastics by one of the processes consisting of packing singly, packing in bundles, pressing, sintering, fusing, soldering and cementing, spraying, and melting.

18. A seal according to claim 1, wherein the bristle layer portion and the bristle core portion are joined one to the other by one of the processes consisting of diffusion and alloying.

19. A seal according to claim 1, wherein the bristle layer portion is attached to the bristle core portion by one of the processes consisting of alloying, vitrifying, laser fusion process and radiation fusion.

20. A seal according to claim 1, wherein the bristle layer portion is deposited on the core by one of the processes consisting of physical vapor deposition, sputtering, electroplating, electrolysis, chemical vapor deposition, spraying, dipping, and electrostatic coating.

* * * * *